United States Patent [19]

Nitta et al.

[11] Patent Number: 5,287,521
[45] Date of Patent: Feb. 15, 1994

[54] METHOD AND APPARATUS FOR RELEASING AND OBTAINING SHARED AND EXCLUSIVE LOCKS

[75] Inventors: Jun Nitta, Yokohama; Shigeru Yoneda, Ebina; Shoji Yamamoto, Chigasaki, all of Japan

[73] Assignee: Hitachi, Ltd., Tokyo, Japan

[21] Appl. No.: 537,908

[22] Filed: Jun. 12, 1990

[30] Foreign Application Priority Data

Jun. 15, 1989 [JP] Japan .................................. 1-153509

[51] Int. Cl.[5] ...................... G06F 13/14; G06F 12/16; G06F 12/14
[52] U.S. Cl. .................................. 395/725; 395/425; 395/650; 395/200; 395/600; 364/246.6; 364/246.8; 364/DIG. 1
[58] Field of Search .............. 395/600, 650, 200, 425, 395/725

[56] References Cited

U.S. PATENT DOCUMENTS

| | | | |
|---|---|---|---|
| 4,318,182 | 3/1982 | Bachman et al. | 395/650 |
| 4,473,133 | 9/1984 | Enriquez et al. | 187/29 R |
| 4,562,539 | 12/1985 | Vince | 395/200 |
| 4,594,657 | 6/1986 | Byrns | 395/725 |
| 4,604,694 | 8/1986 | Hough | 395/650 |
| 4,847,254 | 7/1989 | Obermarck et al. | 395/650 |
| 5,138,713 | 8/1992 | Loten | 395/725 |

*Primary Examiner*—Thomas C. Lee
*Assistant Examiner*—Paul R. Lintz
*Attorney, Agent, or Firm*—Fay, Sharpe, Beall, Fagan, Minnich & McKee

[57] ABSTRACT

A data processing method is designed to provide two-mode locks of an exclusive mode lock and a shared mode lock in serializing the access to a shared data list being concurrently processed among processes and release the shared mode lock and simultaneously obtain the exclusive mode lock if no process obtains the lock as a result of releasing the process out of the shared mode lock.

2 Claims, 17 Drawing Sheets

METHOD AND APPARATUS FOR RELEASING AND OBTAINING SHARED AND EXCLUSIVE LOCKS

BACKGROUND OF THE INVENTION

1. Field of the Invention

The present invention concerns with a data processing method and device which are capable of serializing the access for sharing a data list among the concurrently-operating processes under the multiprocessing or multiprogramming environment run on a computer. More particular, the invention concerns with the data processing method and device which can properly match the serialization of access to the shared data list to a tightly-coupled multiprocessor environment, in which two or more instruction processors share a main storage.

2. Description of the Prior Art

The multiprocessing or multiprogramming environment run on a computer makes it possible to run many processes concurrently. Hereinafter, the term "process" refers to a unit of work done when an operating system performs the assignment of a central processing unit (CPU). In general, a term "task" is often used for representing the same meaning.

In operation, the process requires various kinds of resources such as a CPU, a memory, an input and output device, and the like. Since, however, these resources are shared by two or more processes, a conflict often takes place among these processes in accessing the resources.

In a program, these resources are, in general, represented as data blocks saved in a main storage (virtual storage). Hence, the conflict caused in accessing the resources is embodied as the conflict caused in accessing a list (data list) of each data block. The element processing executed in accessing the data list consists of insertion of a list element, retrieval of a list element, and deletion of a list element. The general operation can be realized by the series of element processings. The operating system has to provide a mechanism for executing the serialization of access to these data lists.

One example of this mechanism is described in S. E. Madnick et al. "Operating Systems" chapter 4.5, McGraw-Hill edition, 1974. As described in the example, a typical mechanism for executing the serialization of access to a data list can be realized by a series of instructions referred to as "lock" and "unlock". This mechanism provides status variables referred to as a lock byte or a lock word, which represents the corresponding data list.

In locking operation, a lock-request process takes the steps of checking the status variable and, if not used, changing the state to "in use" or, if used, waiting until it is not used. In unlocking operation, it takes the steps of changing the status variable from in use to not used and, if necessary, reporting a lock release to another process waiting for a lock.

In this mechanism, the process obtaining a lock includes an exclusive access capability for a data list, while the other processes cannot access the data list until the lock-obtaining process release the lock. In the meantime, the lock-waiting process interrupts the execution, resulting in being suspended or spinning, that is, iteratively checking status variables. In either case, the data processing is temporarily interrupted under this process.

For referencing or updating the status variables, this mechanism employs a machine instruction called as a read-modify-write type instruction which instructs the operation "read-compare-change-write" of a variable to be executed as a combined one. That is, while a process checks that a state variable is not in use and changes the status variable to be an in-use one, this mechanism is used for preventing the same status variable from being rewritten by another process. For example, in a HITAC M series computer, the machine instructions are a TS (Test and Set) instruction, a CS (Compare and Swap) instruction and a CDS (Compare Double and Swap) instruction.

An improvement of the "lock/unlock" mechanism is a mechanism in which a lock has a plurality of modes. This mechanism provides a shared mode lock and an exclusive mode lock. The process obtaining a shared mode lock is capable of merely referencing a data list, while the process obtaining an exclusive mode lock is capable of referencing and updating a data list. A plurality of processes can obtain the shared mode lock concurrently. The shared mode lock is contradictory to the exclusive mode lock as the exclusive mode locks are contradictory to each other. This mechanism is superior to the foregoing simple "lock/unlock" mechanism in that the former can execute the element processing of a data list concurrently even if a plurality of retrieval processings come into conflict with one another in one data list. Yet, only the sequential execution is allowed if the conflict is caused in the other processings except the retrieval one.

The Japanese First Publication No. 62-92061 discloses a mechanism by which the insertion, retrieval and deletion processings can be all executed for a data list concurrently. This mechanism provides a status variable containing discontinuous words. The element processing of a data list is separated into a start processing to be executed concurrently and a finish processing to be executed only sequentially.

A process serves to change the status variable and executes the start processing about a data list. In this case, another process may execute the start processing concurrently. If no other process comes into conflict with the current process, the process executes the finish processing, but if another process comes into conflict, it directly finishes the processing after cancelling the finish processing. Then, any one of the conflicted processes picks up and completes the cancelled processing.

This mechanism is referred to as "obligation passing", which is controlled by the partial change of the status variable. For the processing of the data list, no "obligation passing" is required about the insertion of a list element into a defined one end and the retrieval of any list element. About the deletion of a list element, the processing is separated into a logical deletion processing for setting an invalid flag to a list element and an actual deletion processing for releasing a list element out of a pointer chain, the latter of which is subject to the "obligation passing". Herein, the "obligation passing" is implemented by inserting a list element to a pointer chain for chaining the elements to be deleted, which pointer chain is provided independently of the pointer chain representing a data list.

The foregoing simple lock mechanism is capable of keeping only one process obtaining the lock alive, that is, interrupts the other processes if two or more processes comes into conflict with one another in requesting the lock obtaining. This function brings about the significant degradation of performance as in a tightly-coupled multiprocessor environment in which a plurality of instruction processors share a main storage. The two-mode lock mechanism may suppress the probability of conflict of locks involving the interruption of a process. The suppressing degree, however, is not sufficient.

The use of the "obligation passing" mechanism makes it possible to reference or update a data list without interrupting the process, though, it merely applies to a limited range of processings. That is, the application of the mechanism is limited to the processing which can be properly separated into a start processing to be executed concurrently by a plurality of processes and a finish processing to be processed sequentially and, if a conflict takes place among the processes, to be processed by the other process temporarily after cancelling the finish processing.

Hence, for example, in case the element has been already picked out of the pointer chain when a deletion request of a list element is issued, the "obligation passing" mechanism is ineffective. Such a case needs a processing in which an element deleted from the data list has been serially used in the same process. And, this mechanism provides more overhead of an individual itself in compensation for the upgraded concurrent processing level than the simple lock mechanism. Hence, in case all the elements in a data list are processed in the lump and in large quantity and a complicated manner, for example, this mechanism may lower its overall processing capability as a result. In such a case, the mechanism obtaining the lock and executing the processings in the lump can offer higher degree of freedom for processing and easily suppress the overhead.

SUMMARY OF THE INVENTION

It is therefore an object of the invention to provide an improved lock mechanism which offers higher degree of freedom for processing and a sufficiently lower probability of conflict, that is, a data processing method and device realizing the serialization of access which has so wide an application range as the simple lock mechanism and offers as high a parallel processing level as the "obligation passing" mechanism.

To achieve the foregoing object, the present invention is characterized by providing two modes of an exclusive mode lock and a shared mode lock in case of executing the serialization of access to the shared data list among the processes executing the parallel processings and, if the shared lock mode is released, releasing the shared mode lock and obtaining the exclusive mode lock if there exists no process obtaining a lock after released.

In carrying out the invention in a preferred embodiment, the embodiment is designed to provide a lock area including an exclusive mode lock flag and a shared mode lock counter, represent the obtaining or releasing of the exclusive mode lock by setting or resetting the exclusive mode lock flag, representing obtaining or releasing of the shared mode lock mode by adding or subtracting the shared mode lock counter, and if the subtraction of the shared lock counter results in giving zero, execute the setting operation of the exclusive mode lock flag as a combined operation.

DESCRIPTION OF THE PREFERRED EMBODIMENTS

Figure 1:
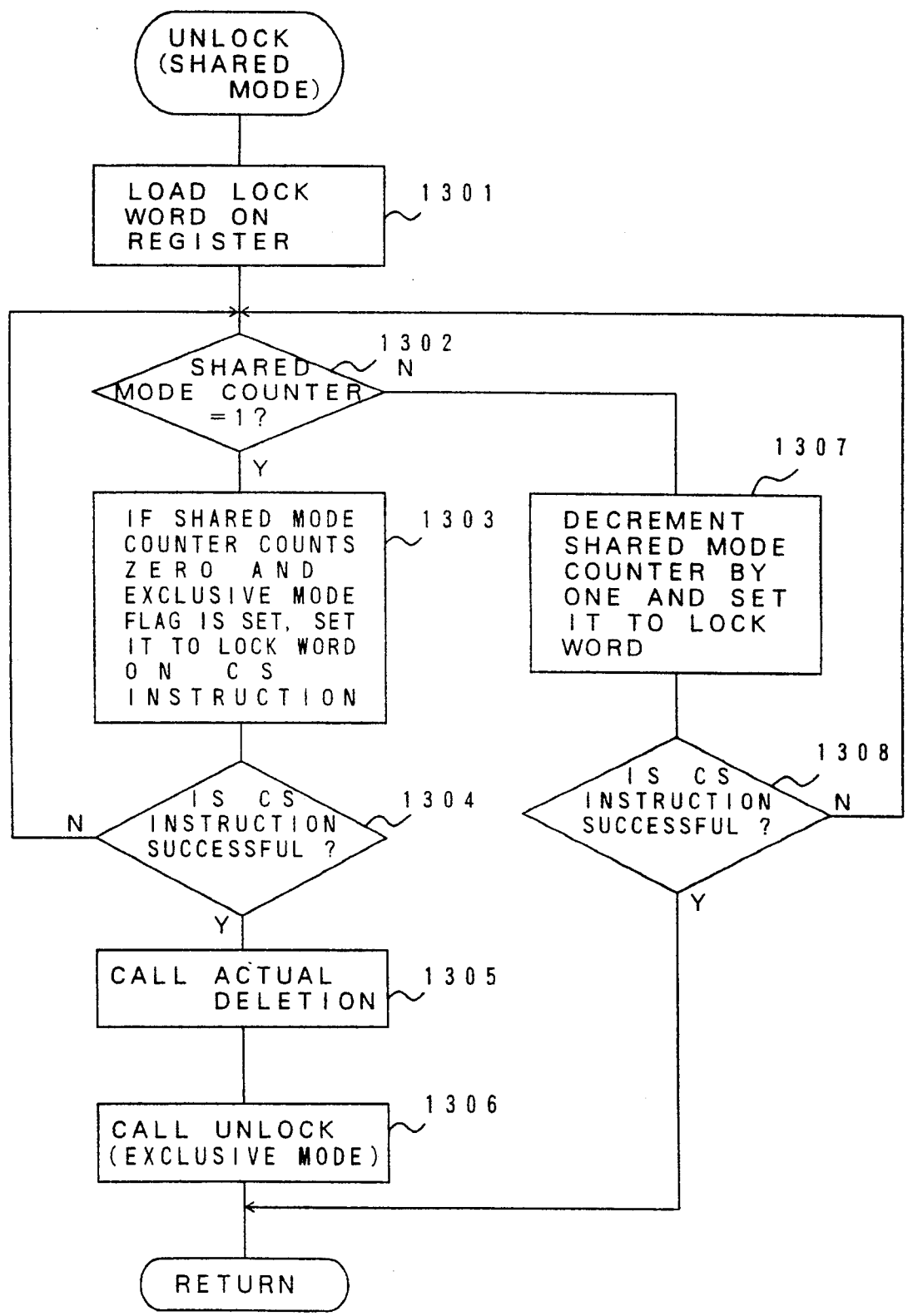
FIG. 1 is a flowchart showing a characteristic operation of an embodiment of the invention.

At first, the invention will be schematically described. Of the list element processings involved in the data list processing, the list element insertion, retrieval and logical deletion are allowed to be concurrently processed by a plurality of processes. The actual deletion has to be exclusively processed by only one process.

In the serialization mechanism of access to a data list according to the invention, those list element insertion, retrieval and logical deletion are allowed to be concurrently executed by a plurality of processes because the shared mode lock can be obtained for these list element processings. On the other hand, about the actual deletion processing program, it is checked if there exists no other process coming into conflict with the current process at the time of releasing the shared mode lock obtained for those insertion, retrieval and logical deletion processings and if not, the exclusive mode lock is obtained for the actual deletion. If it does, the shared mode lock is simply released without executing the actual deletion processing. And the program proceeds to the next processing.

In the latter case, the subject list element is logically deleted from a data list but is actually left. That is, the list element has a deletion flag set thereto but is left in a pointer chain. This list element will be released from the pointer chain by a process for executing the actual deletion processing sooner or later. In other words, in case a plurality of processes have concurrent access to the data list, the last process, that is, the process finally finishing the access and releasing the shared mode lock, serves to execute the actual deletion processing in the lump.

With this mechanism, no lock waiting takes place for obtaining a necessary exclusive mode lock for actual deletion. The only case where the lock waiting takes place under this mechanism is that a process tries to access a data list while the last process is executing the actual deletion processing after it obtained the exclusive mode lock. The probability of the occurrence of this case is far smaller than that given when the lock waiting takes place under the simple lock mechanism. Further, for the processing of updating all the list elements in the lump or wherein the logical deletion is enable to be separated from the actual deletion, the process has to obtain the exclusive mode lock and execute the processing. In the processing the probability of the occurrence of the lock waiting is about same as that given with the simple lock mechanism.

As mentioned above, the mechanism employed in the invention is a resonable expansion of the simple lock mechanism, so that any program having employed the simple lock mechanism is allowed to run with no change. This is because the exclusive mode flag and the shared mode lock counter used in this lock mechanism have the same meanings as those of the simple lock mechanism.

Hereinafter, an embodiment of the invention will be descried in detail with reference to the drawings.

Figure 2:
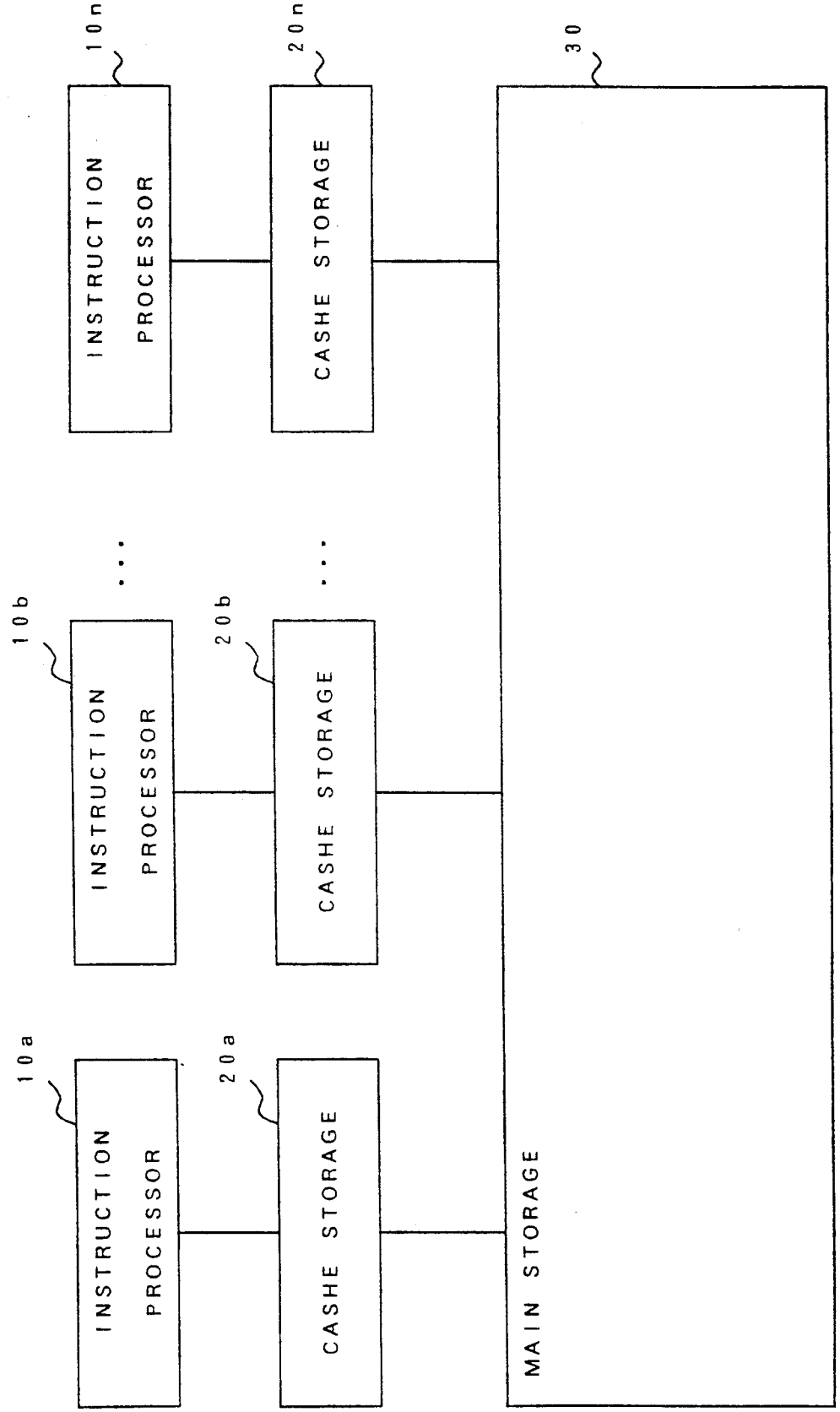
FIG. 2 is a block diagram showing a computer system according to the embodiment of the invention.

FIG. 2 is a block diagram showing a computer system employed in carrying out the invention. As shown, a tightly-coupled multiprocessor is designed so that instruction processors 10a, 10b, ..., 10n share a main storage 30. In this embodiment, each instruction processor provides cache storages 20a, 20b, ..., 20n. In addition, there may be added a cache storage shared by two or more instruction processors or a multistage cache storage.

Each instruction processor 10 can execute a specific instruction (for example, the foregoing CS and CDS instructions) for serializing the execution of an instruction with the other instruction processors. The CS and CDS instructions will be discussed in detail later. In addition, the present invention may be applied even to a computer system having only one instruction processor. It is effective in allowing the multiprocess to efficiently serialize the access to the data list.

Next, two embodiments of the invention will be discussed.

A first embodiment is realized by a normal list processing to which the present invention can be applied. A second embodiment is realized by a queue processing for managing process queuing.

FIRST EMBODIMENT: LIST PROCESSING

Summary

Figure 3:
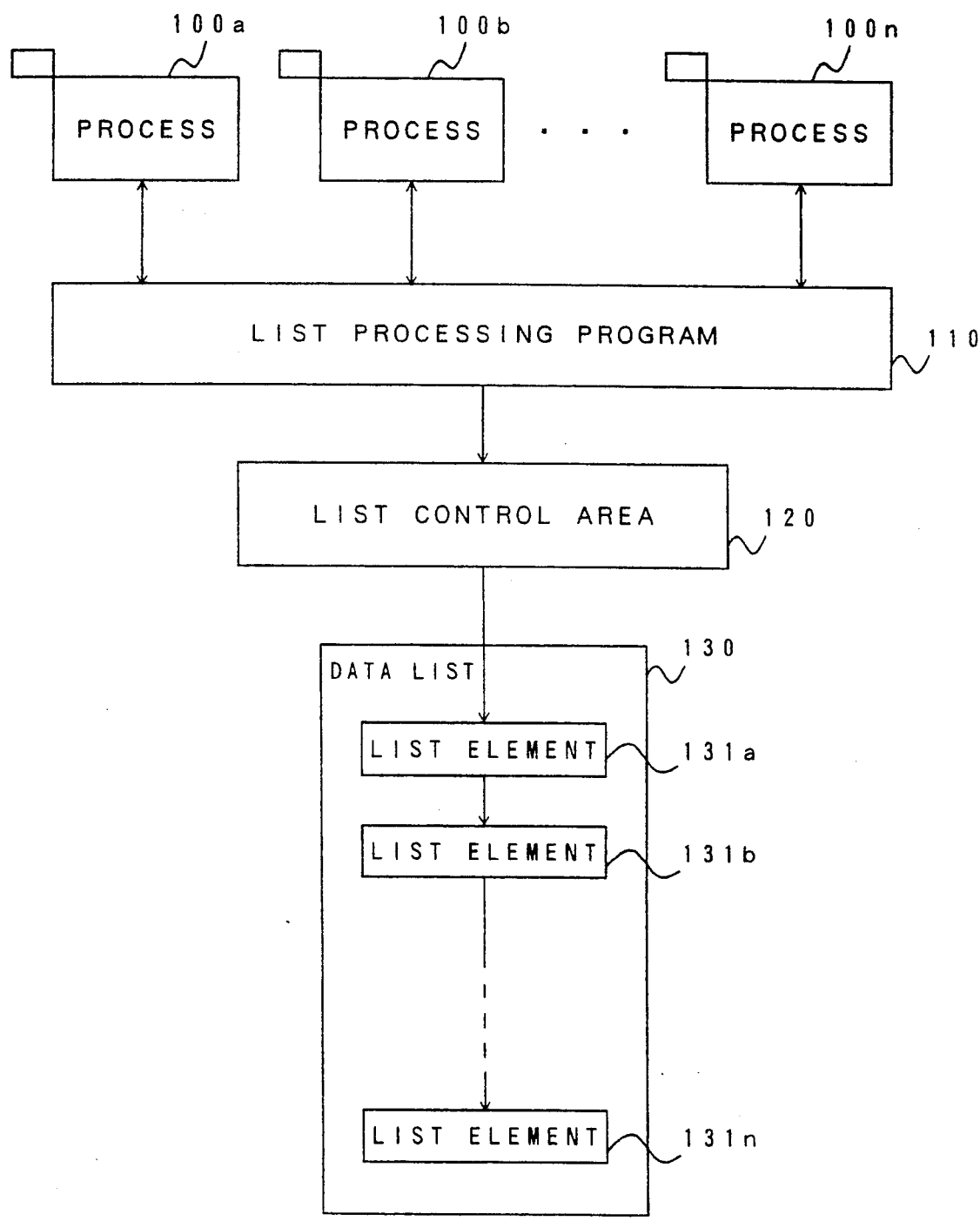
FIG. 3 is a function block diagram showing the function of a first embodiment of the invention.

FIG. 3 is a function block diagram showing the summary of the first embodiment of the invention. This figure illustrates how a plurality of processes 100a, 100b, ..., 100n operating concurrently have access to a plurality of list elements 131a, 131b, ..., 131n contained in a data list 130 managed by a list control area 120 through a list processing program 110. The serialization of the access to the data list 130 done among a plurality of processes 100a, 100b, ..., 100n can be realized by the list processing program 110, which serves to reference and update the information contained in the list control area 120 according to a specified procedure.

Figure 4:
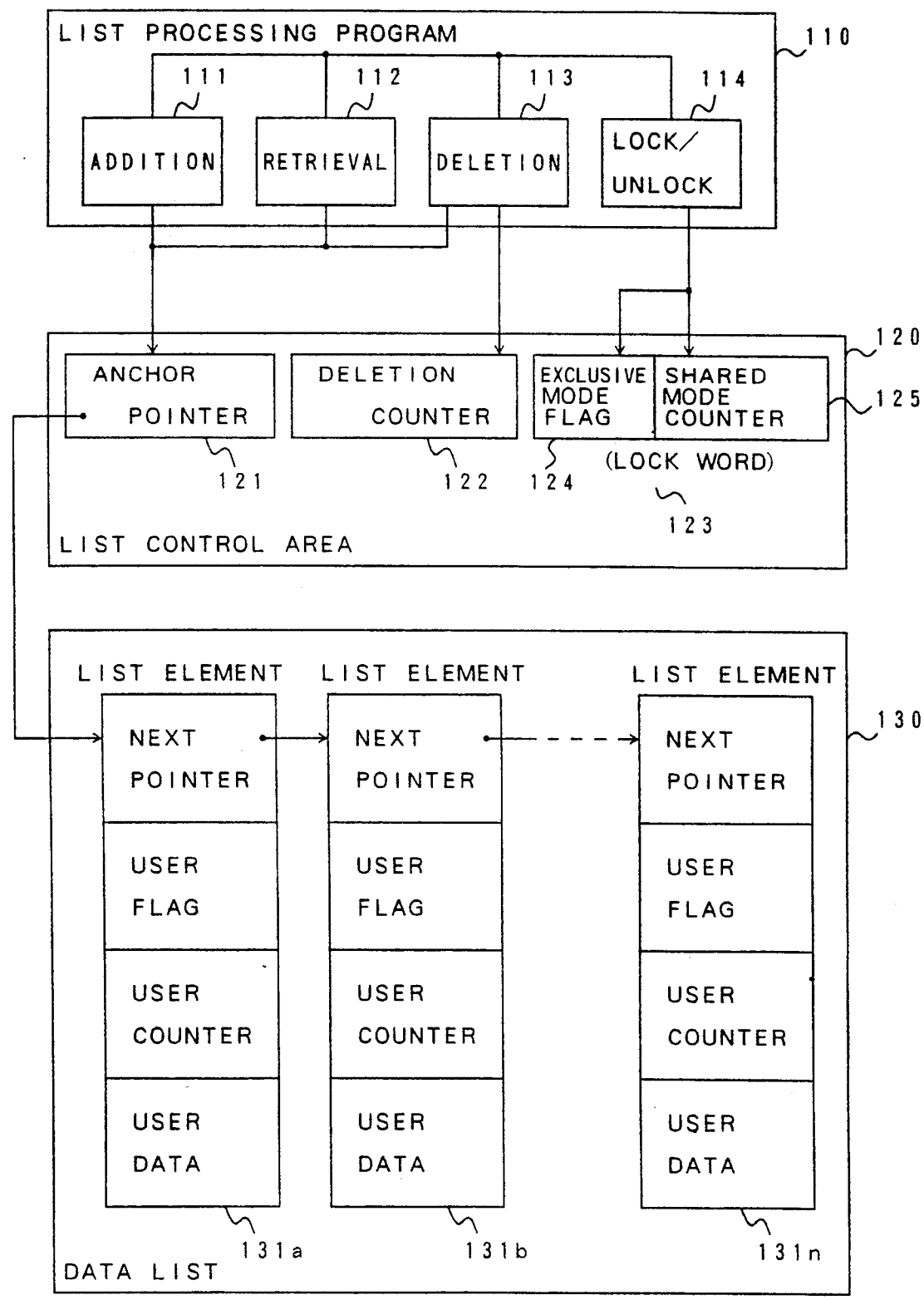
FIG. 4 is an explanatory view illustrating a list processing program, a list control area and a data list.

FIG. 4 shows a detailed structure of the list processing program 110, the list control area 120 and the data list 130. The list processing program 110 comprises an insertion program 111 for inserting a new list element to any position in a data list, a retrieval program 112 for retrieving a list element matched to the specified condition from the data list, a deletion program 113 for deleting any list element from the data list, and a lock and unlock program 114 for serializing the access to the data list among a plurality of processes. The deletion program 113 is separated into a logical deletion program and an actual deletion program. The logical deletion program serves to just set a deletion flag to a list element, resulting in leaving the list element in a pointer chain. The actual deletion program, however, serves to pick up the list element from the pointer chain. And, the lock and unlock program 114 serves to control two-mode locks of an exclusive mode lock and a shared mode lock and is called by the insertion program, the retrieval program and the deletion program.

The concurrently-operating processes call these list processing programs according to the specific interface, resulting in guaranteeing the serialization of access to a list element. These concurrently-operating processes are allowed to keep a high concurrent processing level for processing the data list by calling the insertion program, the retrieval program and the deletion program. Moreover, the concurrently-operating processes are also allowed to share or occupy the data list for freely referencing and updating the data list by calling the lock and the unlock program. As mentioned above, the present invention is eminently effective in keeping occurrence and degree of freedom of the processing compatible with each other.

The list control area 120, as shown in FIG. 4, occupies an area on the main storage (virtual storage) and is composed of an anchor pointer 121, a deletion counter 122 and a lock word 123 consisting of an exclusive mode flag 124 and a shared mode counter 125. The anchor pointer 121, the deletion counter 122 and the lock word 123 are not essentially adjacent to one another. The anchor pointer 121 is a start point of a pointer chain containing chained list elements and is referenced and updated by the insertion program, the retrieval program and the deletion program. And, the deletion counter 122 is a counter for showing the number of list elements not actually deleted but logically deleted and is referenced and updated by the deletion processing. The lock word 123 means an area for managing the exclusive mode lock and the shared mode lock and is referenced and updated by the lock and unlock program.

If the exclusive flag 124 contained in the lock word 123 is set, it means that a process keeps the exclusive mode lock to the data list and exclusively access to the data list. The shared mode counter 125 is a counter which indicates the number of processes obtaining the shared mode lock to the data list. With the conventional lock mechanism, any process obtaining a shared mode lock is allowed to have reference access to the data list. The present invention allows the insertion program and the deletion program for updating the data list to be executed in the shared lock mode.

The list elements 131a, 131b, ..., 131n contained in the data list 130 each consist of a user flag indicating the status of a list element, a user counter indicating the number of processes having access to the list element and a user data indicating any content. The foregoing user flag consists of any number of flags representing the status of a list element. The present invention, however, relates to the deletion flag indicating that a list element is logically deleted. The user counter is a shared counter for each list element which indicates the number of processes having concurrent access to a list element if two or more processes concurrently access the list element. Yet, it is not essential. The content of the user data may be changed according to how the data list is concretely applied and include key information for dedicatedly identifying the list element.

CS Instruction and CDS Instruction

Before discussing the list processing program, it may be necessary to simply describe the foregoing CS and CDS instructions which are specific machine instructions used in the list processing program. The CS instruction is a read-modify-write type instruction which instructs to execute the combined operation of comparing the content of a first register with the content of one word stored on the main storage (virtual storage) and, if both are equal, rewriting the word with the content of a second register or if neither are equal, loading the content of the word on the first register.

The CDS instruction does the same operation as the CS instruction. Yet, the different respect between both instructions is that the latter instruction can process a word, while the former one can process double words. In a tightly-coupled multiprocessor in which two or more instruction processors share the main storage, if the process being executed by a processor changes the content of a status variable on the main storage, the use of the normal load-compare-store instruction results in the status variable being rewritten by another processor at an interval between the compare and the rewrite (store) processings and the integrity about the processing being broken. For avoiding this result, with the CS and CDS instructions, it is necessary to execute the compare and rewrite processings in one operation.

Hereinafter, the list processing program will be discussed on the flowchart.

Exclusive Mode Lock/Unlock

The exclusive mode lock is a mechanism in which one process can occupy a data list. If a process obtains the exclusive mode lock of a data list, it can freely access the data list for referencing and updating. On the other hand, while a process is obtaining the exclusive mode lock, the other processes can never access the data list.

Figure 7:
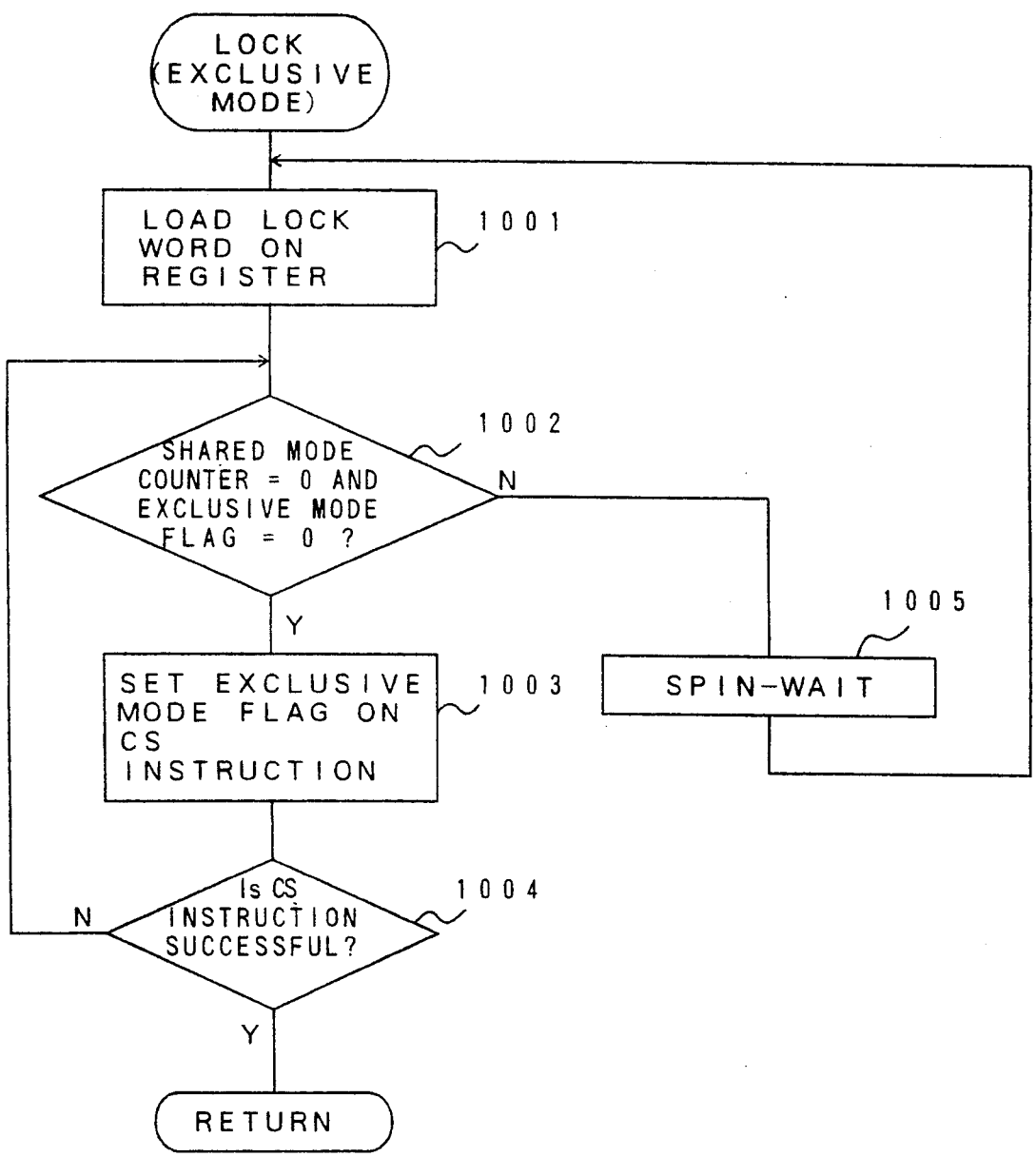
FIGS. 7 to 13 are flowcharts illustrating the list processing program.

FIG. 7 shows the flow of the exclusive mode lock processing program. At first, the program loads a lock word on a first register to be used for the CS instruction (step 1001) so as to check if the exclusive mode flag is set and the shared mode counter is zero (step 1002). If yes, the program loads the content of the lock word indicating that the exclusive flag is set on a second register for the CS instruction (step 1003) and then rewrites the lock word based on the CS instruction. If the compare done by the CS instruction is successful, it means that the exclusive mode flag is set to the lock word loaded on the main storage (virtual storage). Then, the program returns to a caller (step 1004). If the compare is not successful, it means that another process rewrites the lock word at an interval between the loading of the lock word at the step 1001 and the execution of the CS instruction at the step 1003. The program retries the processing from the step 1002. In this case, the retry-starting step is not the step 1001 but the step 1002, because a new lock word has already loaded on the first register based on the specification of the CS instruction.

If the exclusive mode flag has already set at the step 1002 or the shared mode counter is 1 or more, it means that another process obtains the exclusive mode lock or the shared mode lock. Hence, the process has to wait in spinning (referred to as "spin-wait"). Spin-waiting means an indefinite loop processing containing the steps 1001 and 1002 as a part. It interrupts a processing executed by the process. As the lock conflict ratio becomes higher, the spin-waiting interval is made longer and the performance is remarkably degraded.

Figure 8:
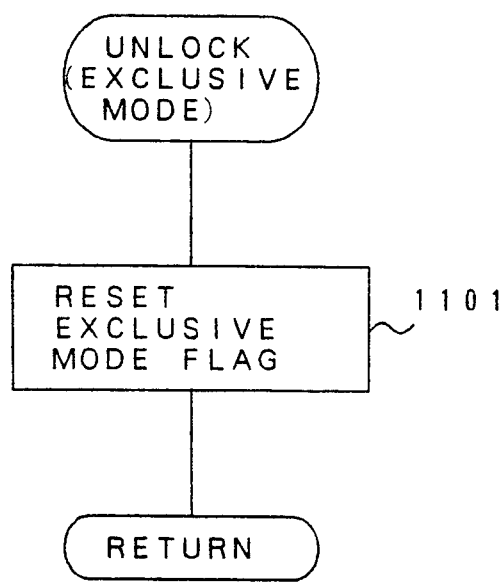

FIG. 8 shows the flow of the unlock processing of the exclusive mode lock. To release the exclusive mode lock, it is necessary to just reset the exclusive flag set to the lock word (step 1101). This processing does not require the CS instruction, because only one process obtains the exclusive mode lock and thus no conflict about the exclusive mode unlock processing takes place among the processes.

Shared Mode Lock/Unlock

Figure 9:
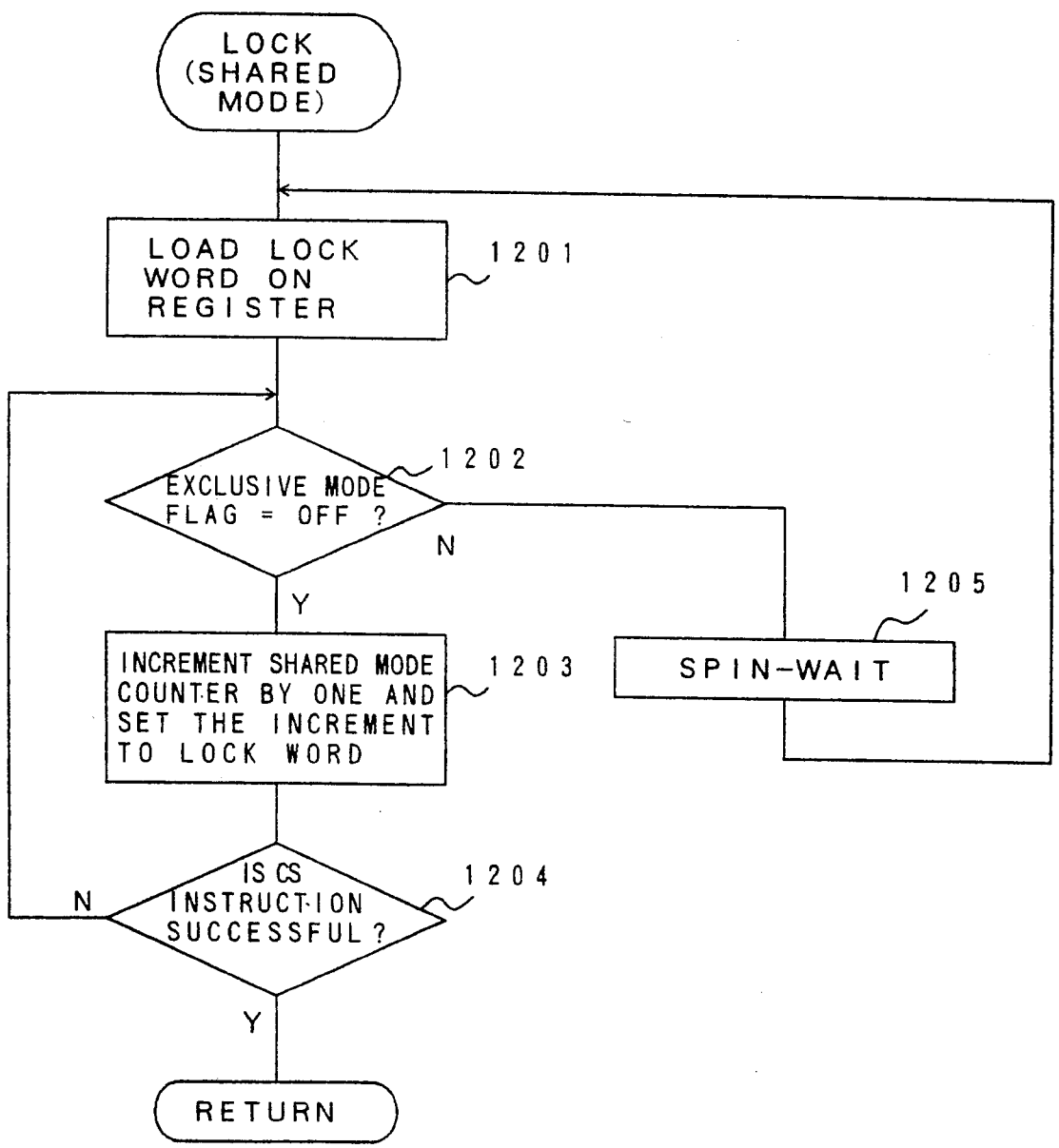

The shared mode lock is allowed to be concurrently obtained by a plurality of processes and merely comes in conflict with the exclusive mode lock. It thus offers a lower possibility of degrading the performance as a result of the lock conflict than the exclusive mode lock. FIG. 9 shows the flow of the shared mode lock processing program. At first, the lock word is loaded on the register (step 1201) to check if no exclusive flag is set (step 1202).

If no exclusive flag is set, the content of the lock word is set as a value given by incrementing the shared mode counter by one based on the CS instruction (step 1203). If the compare of the CS instruction is successful, it means that the lock processing program obtains the shared mode lock for the process and then returns to a caller (step 1204). If the compare of the CS instruction is not successful, it means that another process rewrites the lock word at an interval between the loading of the lock word at the step 1201 and the execution of the CS instruction at the step 1203. The program retries its processing from the step 1202. If another process has already obtained the exclusive mode lock, the current process has to spin-wait until the exclusive mode lock is released (step 1205).

The foregoing exclusive mode lock/unlock and the shared mode lock processings are the same as the conventional exclusive and shared two-mode lock processsings. That is, the processings are not specific to the present invention. The foregoing description has been expanded for more proper understanding of the description of the embodiments.

FIG. 1 is a flowchart showing the flow of the shared mode unlock processing program, which is a core of the invention and is different from the conventional lock mechanism. At first, the shared mode unlock processing program loads the lock word on a first register to be used for the CS instruction (step 1301) to check if the shared counter counts one, that is, the current process is a last process for releasing the shared mode lock (step 1302). If yes, the program loads the lock word content indicating that the shared counter counts zero and the exclusive flag is set on a second register to be used for the CS instruction and rewrites the lock word based on the CS instruction (step 1303). If the CS instruction is successful, it means that the current process releases the shared mode lock and obtains the exclusive mode lock (step 1304). In this state, the unlock processing program calls an actual deletion processing program of the list element (step 1305), executes the exclusive mode unlock processing (step 1306), and returns to the caller.

If the shared mode counter counts two or more at the step 1302, it means that another process obtains the shared mode lock in addition to the current process. In this case, if the lock word is set by the CS instruction to indicate that the shared mode counter is decremented by one (step 1307). If the CS instruction is successful, the program immediately returns to the caller. At the step 1304 or 1308, if the compare done by the CS instruction is failed, it means that after the lock word is loaded at the step 1301, another process rewrites the lock word at an interval between the loading of the lock word at the step 1301 and the execution of the CS instruction at the step 1303 or 1307. The shared mode unlock processing program retries the processing from the step 1302.

This phenomenon is brought about when a conflict takes place among the shared mode lock processings or the shared unlock and the shared lock processings done by two or more processes. As shown in FIG. 1, the shared mode unlock processing done by the conventional mechanism can be arranged by removing the steps 1302 to 1306 and placing the step 1307 immediately after the step 1301.

Of the foregoing insertion, retrieval and deletion processings of the data list element, only the actual deletion processing of the list element requires the steps of obtaining the exclusive mode lock and occupying the data list in executing it. By obtaining the exclusive mode lock for the actual deletion processing at the same time of the last shared mode lock release, no spin-waiting status is brought about in obtaining the exclusive mode lock. If the data list element processing according to this invention brings about the spin-waiting status, it indicates just the state wherein a process executes the processings from the steps 1303 to 1306 in FIG. 1, while another process tries to insert, retrieve and delete the list element. Hence, the degradation of the concurrent processing level resulting from the lock conflict is suppressed far more than that in the conventional lock mechanism. The lock mechanism of this invention has upward compatibility with the conventional two-mode lock mechanism, so that it can be easily built in the existing program. This is because the present invention follows the prior art in the meaning of the lock word and improves how to use the lock word.

Insertion of List Element

Figure 10:
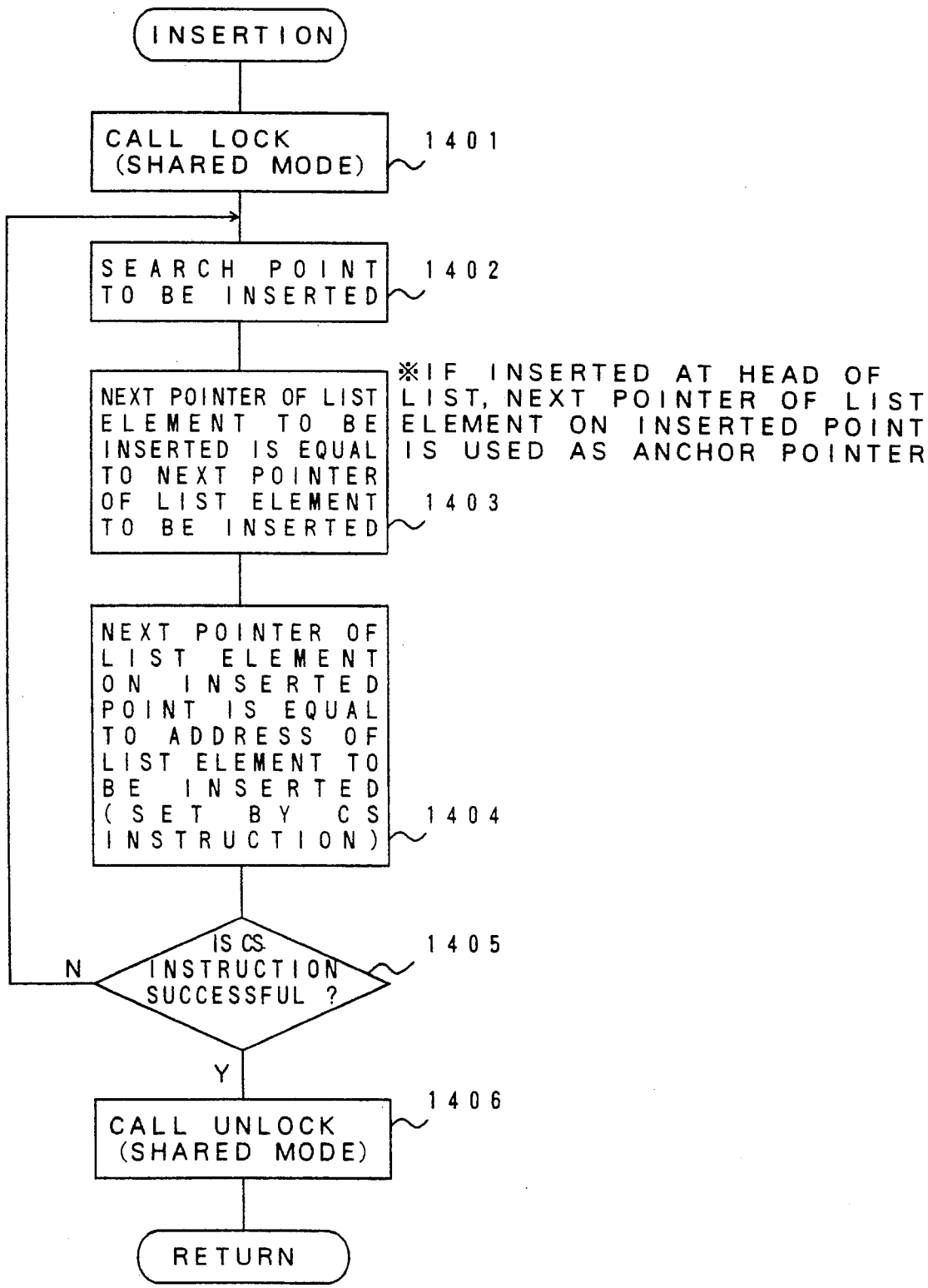

FIG. 10 shows the flow of the list element insertion processing program. At first, the program obtains the shared mode lock for a process (step 1401) and defines a position on a pointer chain to which a list element should be inserted according to the specification of the insertion-processing request resource (step 1402). Next, it sets a next pointer on a list element to be inserted (step 1403) and updates the existing pointer chain based on the CS instruction (step 1404). If the CS instruction is successful (step 1405), it releases the process out of the shared mode lock (step 1406) and returns to the caller. If the CS instruction is failed, it means that the process comes into conflict in the insertion processing with another process trying to insert another list element on the same position. In this case, the program retries the processing from the step 1402.

Figure 5:
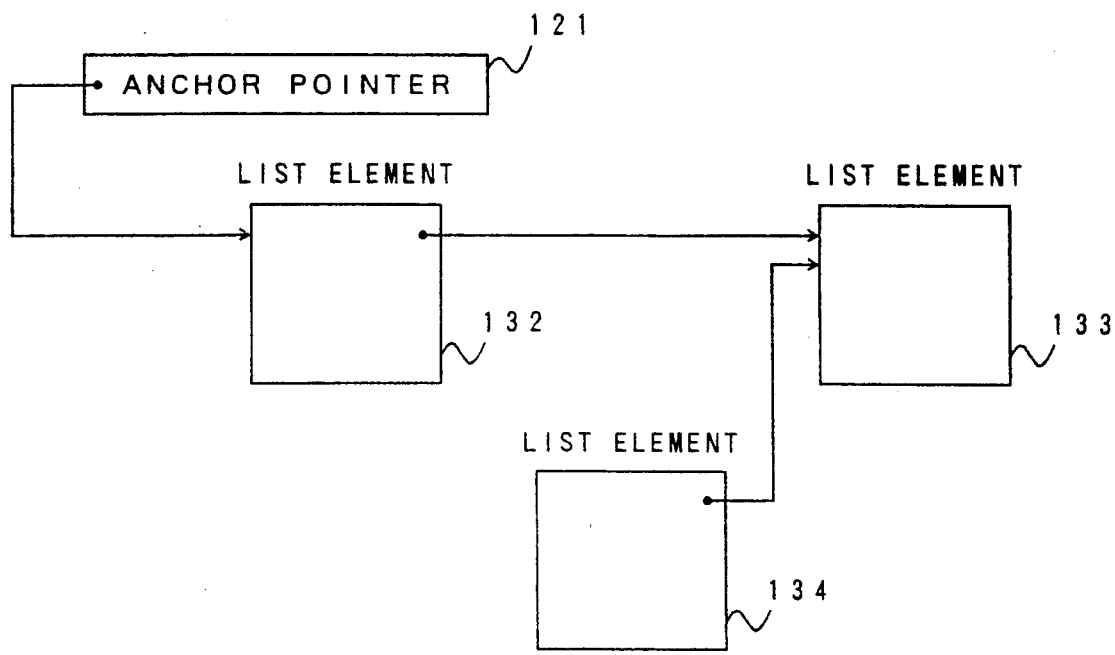
FIGS. 5 and 6 are explanatory views illustrating how a list element is inserted to a data list.
Figure 6:
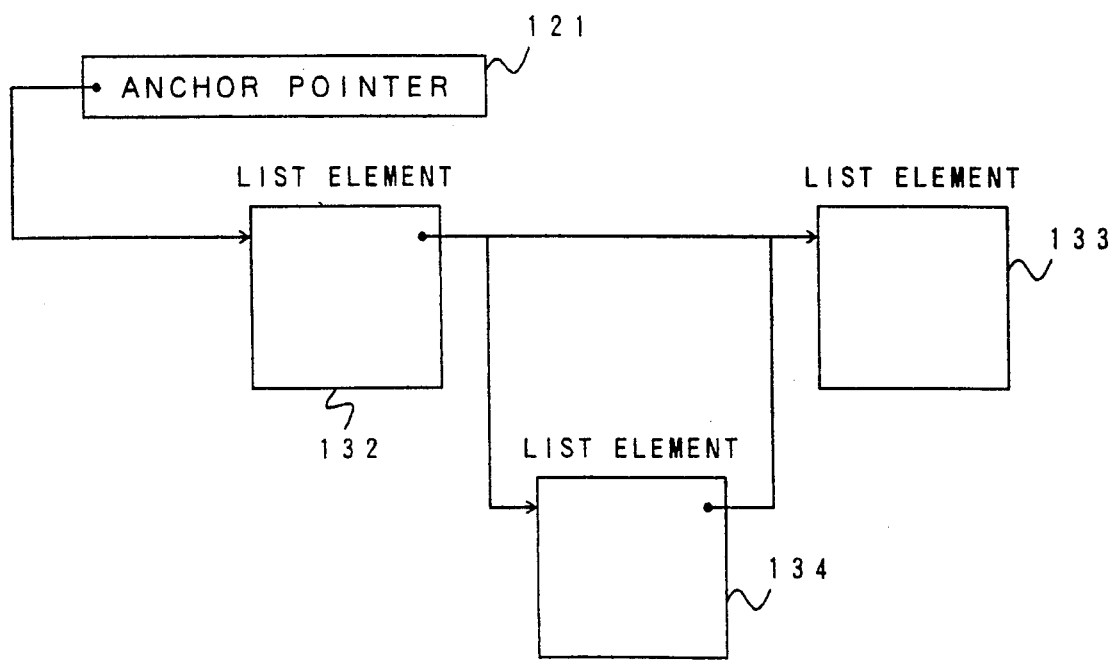

How to insert the list element will be easily understood with reference to FIGS. 5 and 6, which illustrate that a list element 134 is newly added to the existing data list containing list elements 132 and 133. If it is determined the list element 134 is inserted between the list elements 132 and 133, at first, the process sets an address of the list element 133 to a next pointer of the list element 134 (see the step 1403 of FIG. 10). Since only the processes trying to insert the list element 134 have access to the list element 134, the next pointer can be set by the normal store instruction.

Next, the process changes the next pointer of the list element 132 from the address of the list element 133 to that of the list element 134 (step 1404 of FIG. 10). Concurrently, the list element 132 may be accessed by the other processes obtaining the shared mode lock. For setting the next pointer, it is necessary to use the CS instruction. If the current process comes into conflict in the insertion processing with the other processes trying to insert the list element on the same position, the next point of the list element 132 has a different value from the address of the list element 133. It means that the CS instruction at the step 1404 of FIG. 10 is failed. And, if the process tries to insert the list element 134 to the head of the data list, the anchor pointer 121 can be updated by the CS instruction in place of the next pointer of the list element one before the head.

The foregoing insertion processing program makes it possible to insert a new list element at any position of the data list. It should be noted that in the insertion processing according to the conventional lock mechanism, the process obtains or releases the exclusive mode lock in place of the shared mode lock at the steps 1401 and 1406 of FIG. 10.

Retrieval of List Element

Figure 11:
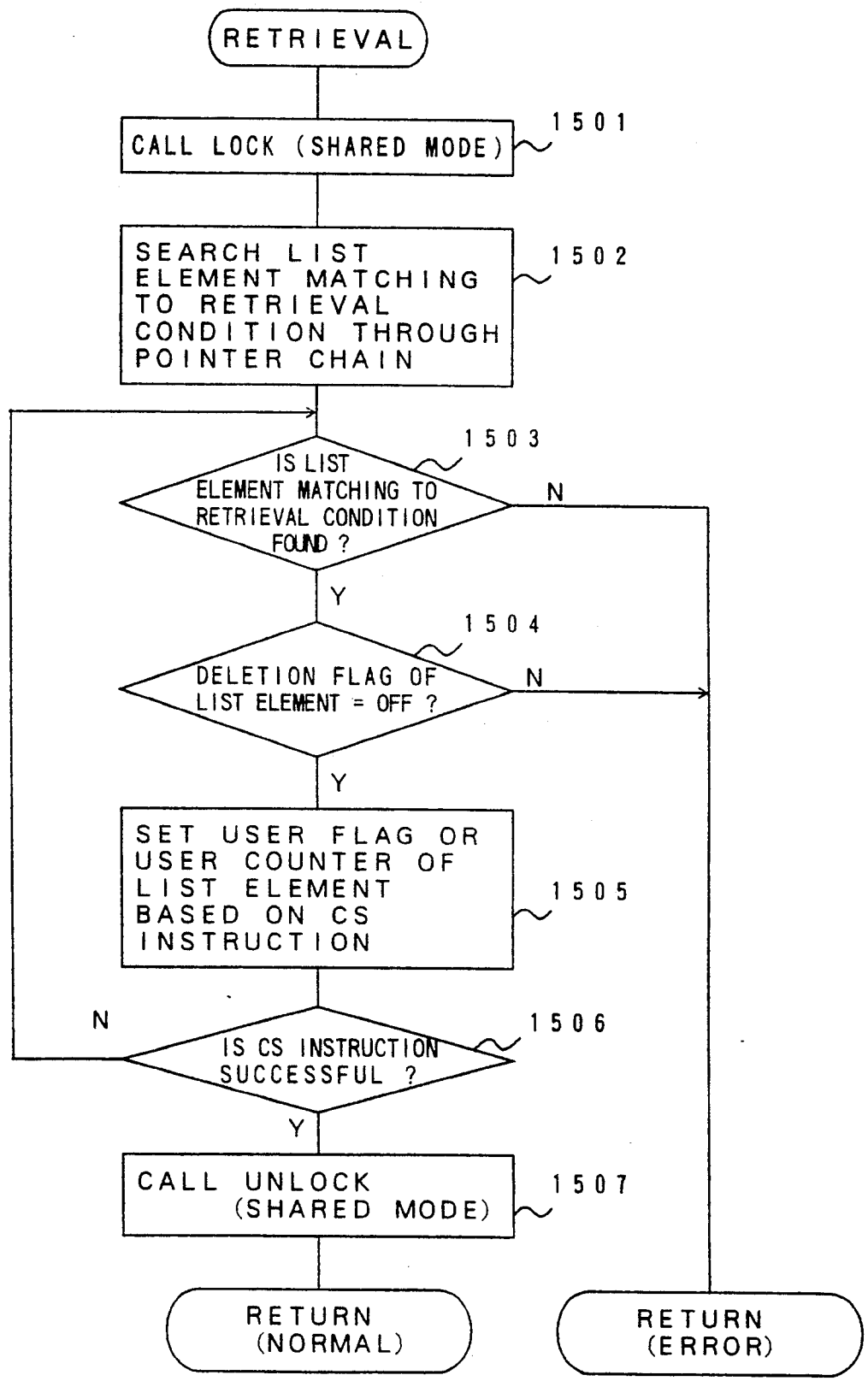

FIG. 11 shows the flow of the list element retrieval processing program. The retrieval processing program obtains the shared mode lock for a process (step 1501) and retrieves the list element matching to the specified retrieving condition through a pointer chain (step 1502). If the list element matching to the retrieval condition exists and the list element provides no deletion flag set thereto (steps 1503, 1504), that is, it is not logically deleted, the program changes the user flag or the user counter of the list element based on the CS instruction in a manner to bring the list element to an in-use state (steps 1505, 1506), releases the shared mode lock, and returns to the caller. If no list element matching to the retrieval condition exists or the list element has been logically deleted, the program sets the content as return information and then returns with an error. If the CS instruction at the step 1505 is failed, it means that the process comes into conflict in the deletion processing with the other processes. In this case, the retrieval processing program retries its processing from the step 1503. This retrieval processing is the same as that employed in the conventional lock mechanism except that the content of the shared mode unlock processing is replaced with that of the present invention.

Deletion of List Element

Figure 12:
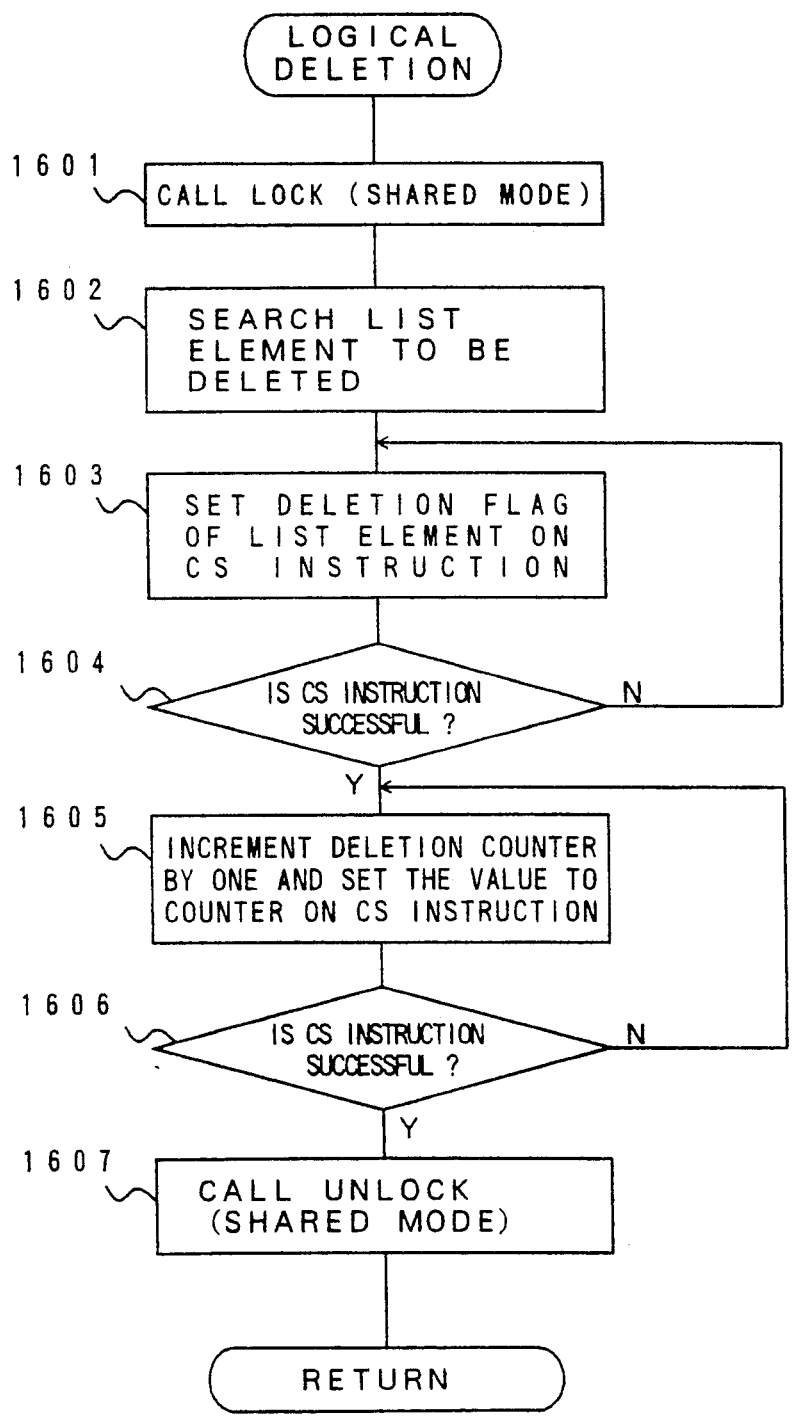

The deletion of the list element is performed at two stages of logical deletion and actual deletion. These logical and actual deletions are not necessarily carried out by the same process. FIG. 12 shows the flow of a logical deletion processing program of a list element. At first, the program obtains the shared mode lock for a process (step 1601) and searches a list element to be deleted (step 1602). Then, the program sets the deletion flag to the list element based on the CS instruction (step 1603). If the CS instruction is successful (step 1604), it counts up the deletion counter of the list control area based on the CS instruction (step 1605). If the CS instruction is successful (step 1606), it releases the shared mode lock (step 1607) and returns to the caller. If the CS instructions at the steps 1603 and 1605 are failed, the program retries to execute the CS instruction and update a flag and a counter.

Figure 13:
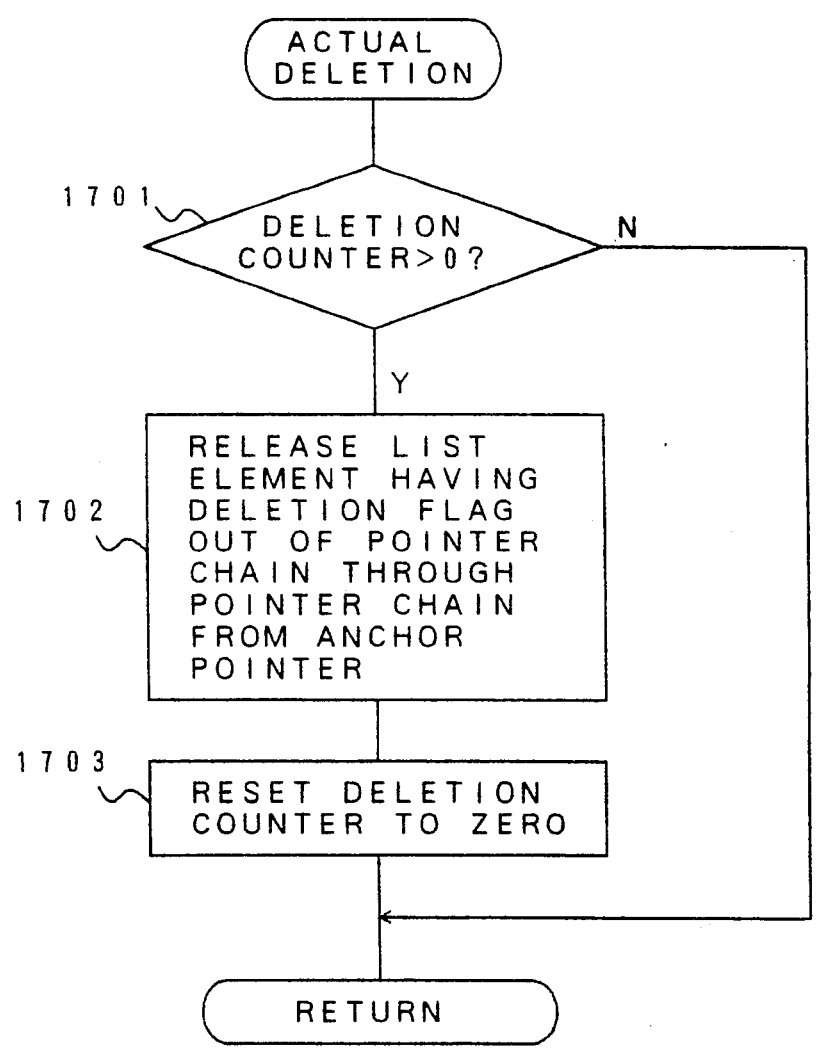

FIG. 13 shows the flow of the actual deletion processing program. The program checks a value of the deletion counter (step 1701) and, if it counts one or more, sequentially scans list elements from an anchor point, and releases the list element having the deletion flag set thereto out of the pointer chain (step 1702). After all the list elements are scanned, the program resets the deletion counter to zero (step 1703). This actual deletion processing program has to be executed when the process obtains the exclusive mode lock.

Figure 14:
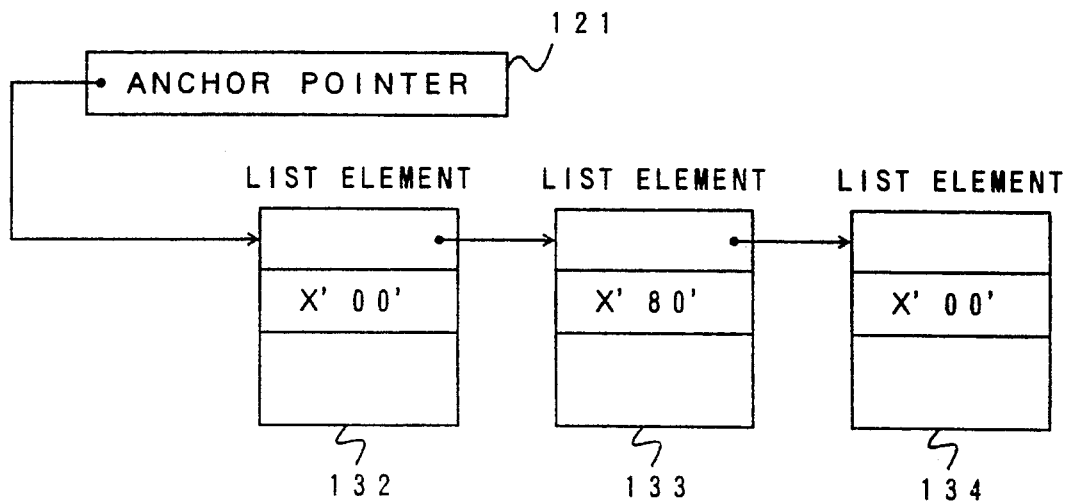
FIG. 14 is an explanatory view showing a logical deletion processing program of the list element.
Figure 15:
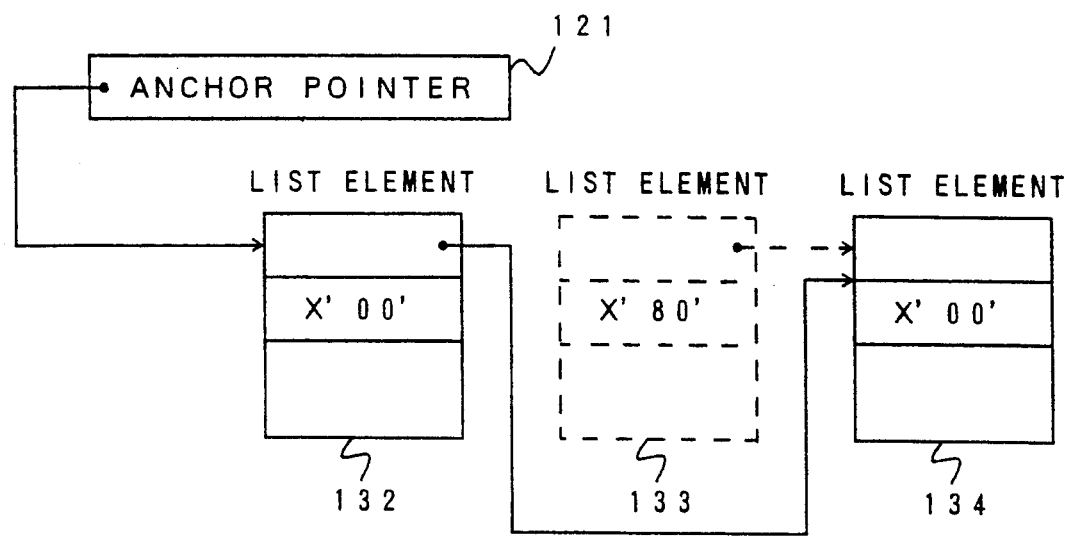
FIG. 15 is an explanatory view showing how a list element is actually deleted.

It will be easily understood how the deletion processing program is executed with reference to FIGS. 14 and 15. FIG. 14 shows a state wherein the foregoing list element 133 is logically deleted. FIG. 15 shows a state wherein the list element 133 is actually deleted. This two-stage deletion processing program is effective only when the deleted list element is not reused in the later processing. If the subsequent process tries to reuse the list element deleted from the data list, the list element has to be released out of the pointer chain when the process returns from the deletion processing program to the caller. That is, the process has to obtain the exclusive mode lock and execute the logical deletion processing and the actual deletion processing at the same time. The present invention can flexibly meet with such a case in a manner to keep the concurrent processing level similar to the prior art.

Next, a description will be directed to the second embodiment of the present invention.

The first embodiment relates to the list processing to which the invention is applied, but the second embodiment relates to the queue processing for managing queuing of processes to which the invention is applied.

SECOND EMBODIMENT: QUEUE PROCESSING

Summary

Figure 16:
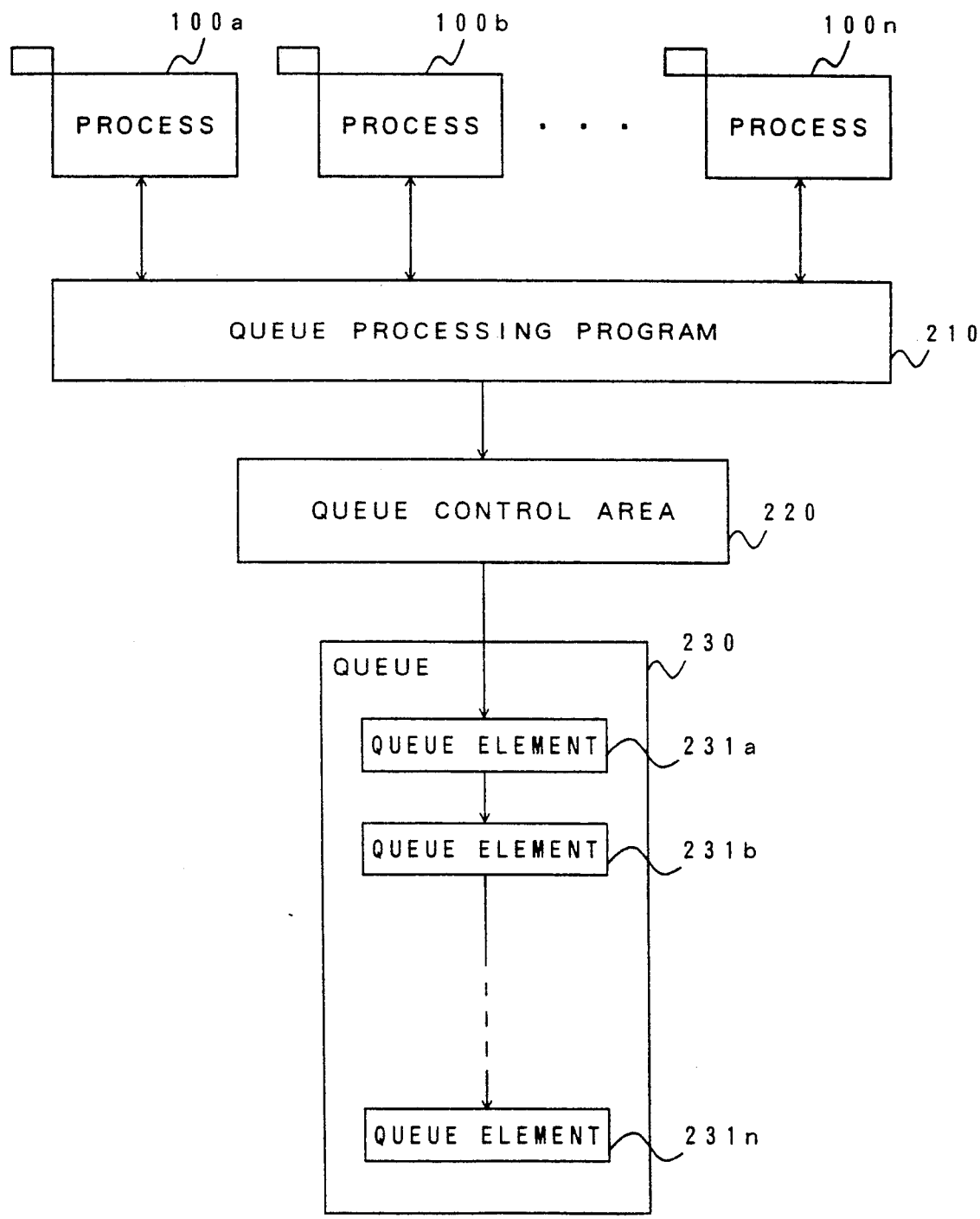
FIG. 16 is a function block diagram showing the function of a second embodiment of the invention.

FIG. 16 is a function block diagram showing the summary of the second embodiment of the invention. This figure illustrates an example in which, for realizing queuing of processes, a plurality of processes 100a, 100b, . . . , 100n operating concurrently are designed to have access to a queue containing queue elements 231a, 231b, . . . , 231n managed by a queue control area 220 through a queue processing program 210. Of these processes, the specified number or less of processes obtain a capability of process execution and are allowed to execute. The other processes are entered into a first-in first-out queue in which they waits for obtention of the capability of process execution. This queue is a specific form of a data list according to the first embodiment.

Figure 17:
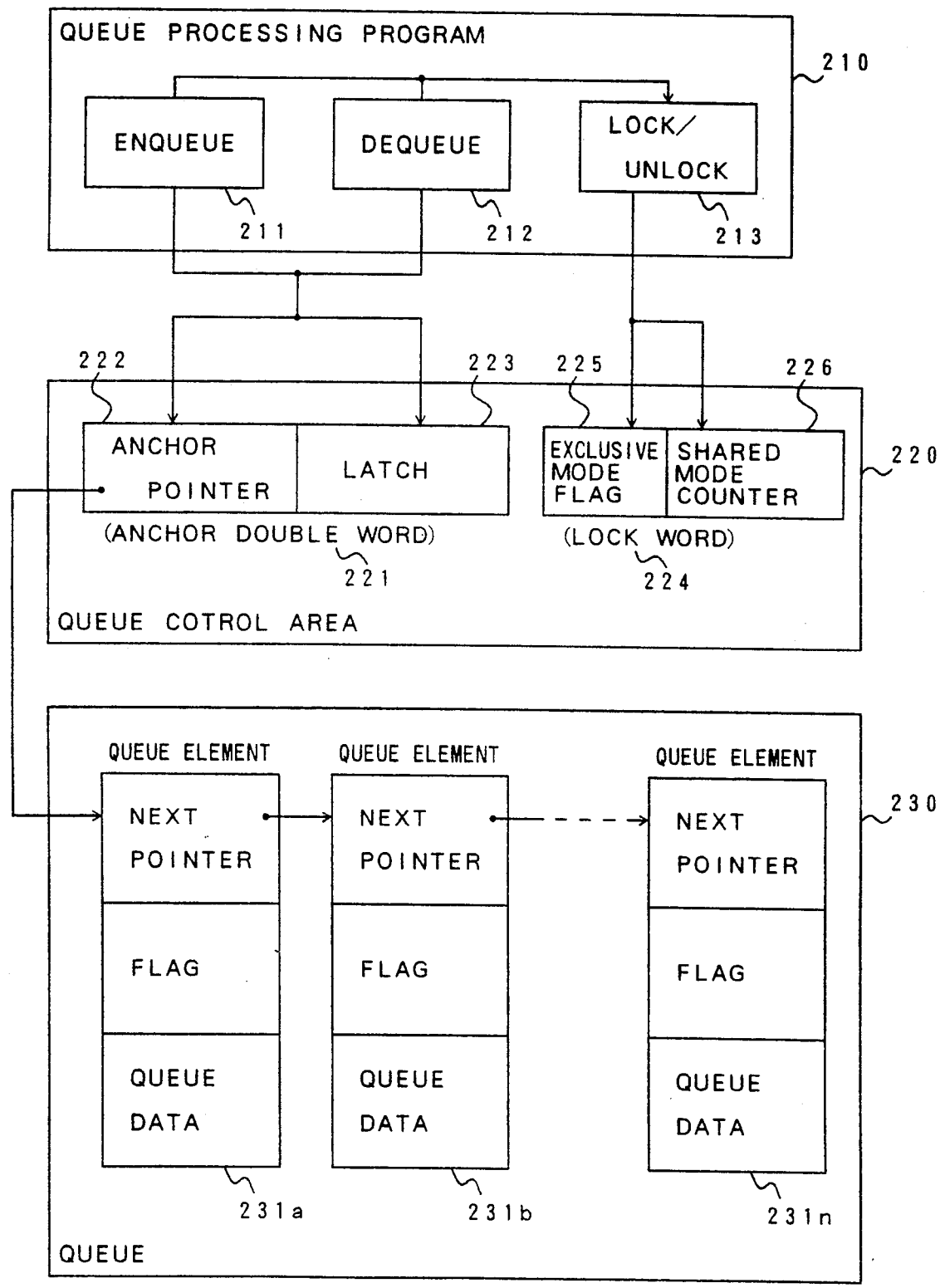
FIG. 17 is an explanatory view showing a queue processing program.

FIG. 17 illustrates the detailed arrangements of the queue processing program 210, the queue control area 220 and the queue 230. The queue processing program 210 comprises an enqueue program 211 for obtaining a capability of process execution and waiting for the obtention if not, a dequeue program 212 for returning the obtained capability of process execution, and a lock and unlock program 213 for controlling serialization of the access to the queue element. The enqueue program 211 and the dequeue program 212 serve to call the lock and unlock program.

The queue control area 220 comprises an anchor double word 221 containing an anchor pointer 222 served as a starting point of a queue-element pointer chain and a 223 indicating how the capability of process execution is given, and a lock word 224 containing an exclusive mode flag 225 and a shared mode counter. On the main storage (virtual storage), the anchor double word 221 is not necessarily adjacent to the lock word 224. The anchor double word is updated by the CDS instruction and the lock word is updated by the CS instruction. How to use the anchor pointer and the lock word is basically same as that disclosed about the first embodiment.

The latch 223 saves at an initial mode a positive integer, which indicates a maximum value of a capability of process execution to be given. Each time a process obtains the capability of process execution by the enqueue processing, the latch is decremented one by one. If the latch saves a zero value, it means that the capability of process execution is no longer given to the process. Under this state, if the process executes the enqueue processing, the latch saves a negative value, that is, the process is queued. In addition, the latch is incremented one by one by the dequeue processing.

The queue element stands for a queued process and comprises a next pointer indicating the next queue element on the pointer chain, flags indicating the state of the queue element, and queue data containing the information of the process matching to the queue element. Of the flags, this invention concerns with a transfer flag indicating that the capability of process execution is given to the process matching to the queue element. The transfer flag also serves as the deletion flag disclosed in the first embodiment.

In the queue processing program, the lock and unlock processing is the same as that disclosed in the first embodiment. Hence, the description about this processing is left out. Then, a description will be directed to the enqueue processing and the dequeue processing which are specific to the second embodiment.

Enqueue

Figure 18:
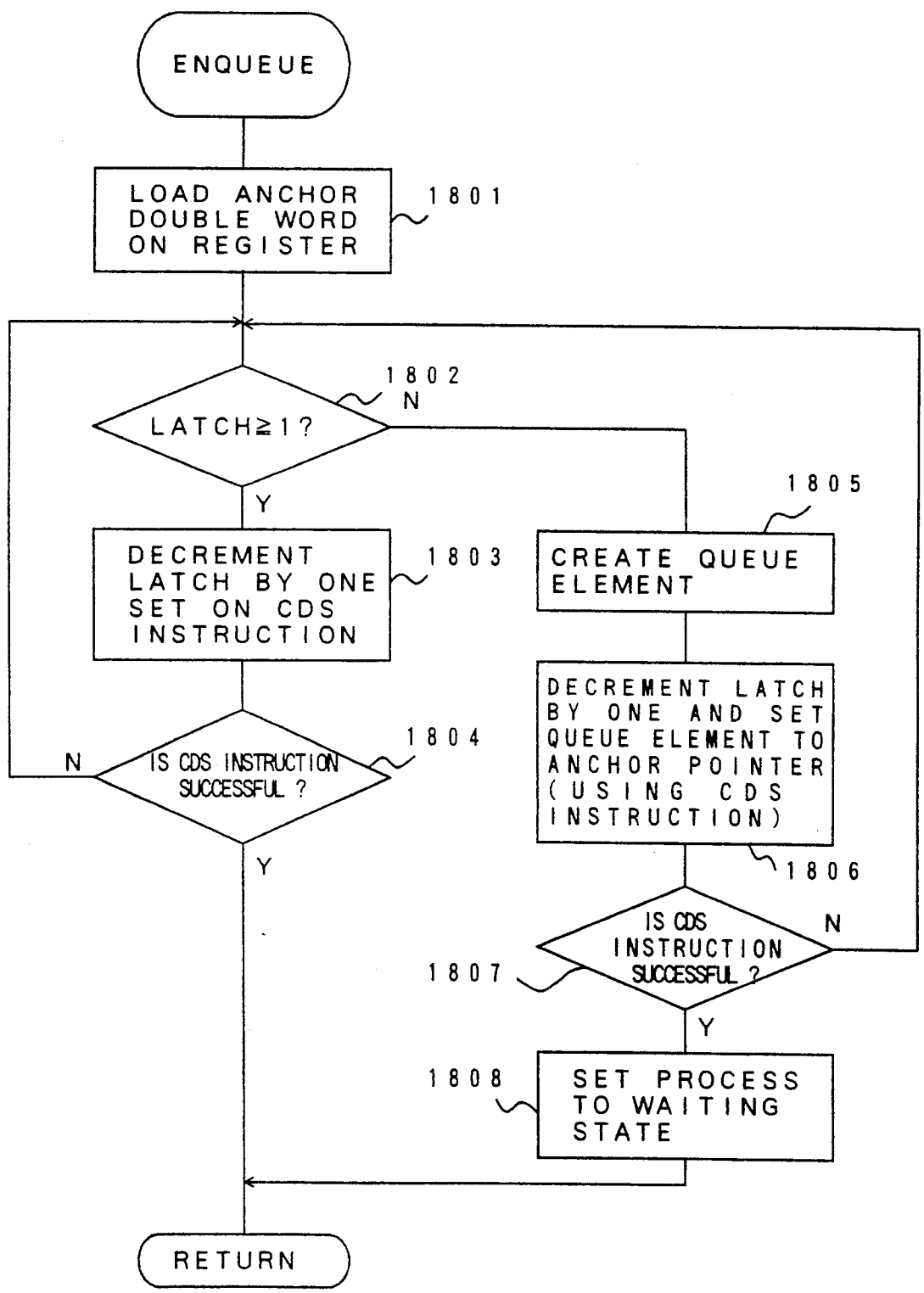
FIGS. 18 and 19 are flowcharts showing the queue processing program according to the second embodiment of the invention.

The flow of the enqueue processing is illustrated in FIG. 18. In the enqueue processing, at first, the enqueue program loads the anchor double word on a first register (more precisely, two adjacent registers) to be used for the CDS instruction (step 1801). Next, the program checks the anchor double word loaded on the register for the value saved in the latch contained therein (step 1802). If the value is 1 or more, that is, there is still left the capability of process execution to be given, the program sets the content of the anchor double word whose latch is decremented by one to a second register (more precisely, two adjacent registers) to be used for the CDS instruction and updates the anchor double word with the CDS instruction (step 1803).

If the CDS instruction is successful at a step 1804, it means that the enqueue programs provides the capability of process execution and returns to the caller. If the latch has a value of zero or less at the step 1802, that is, there exists no capability of process execution, the program creates the queue elements to be used for waiting of the processes (step 1805), decrement the CDS instruction by one and add the queue element to the final queue end, that is, the anchor pointer side end (step 1806). If the CDS instruction is successful at the step 1807, it means that the program brings the process into a waiting state (step 1808). The waiting state is sequentially released as the process returns the capability of process execution as a result of the dequeue processing.

If the CDS instruction is failed at the step 1803 or 1806, it means that the other process rewrites the anchor double word, that is, the other process comes into conflict with the current process in the respect of the enqueue or dequeue processing or the anchor double word access at an interval between the loading of the anchor double word at the step 1801 and the execution of the CDS instruction at the step 1803 or 1806. In this case, the enqueue program retries its processing from the step 1802.

Dequeue

Figure 19:
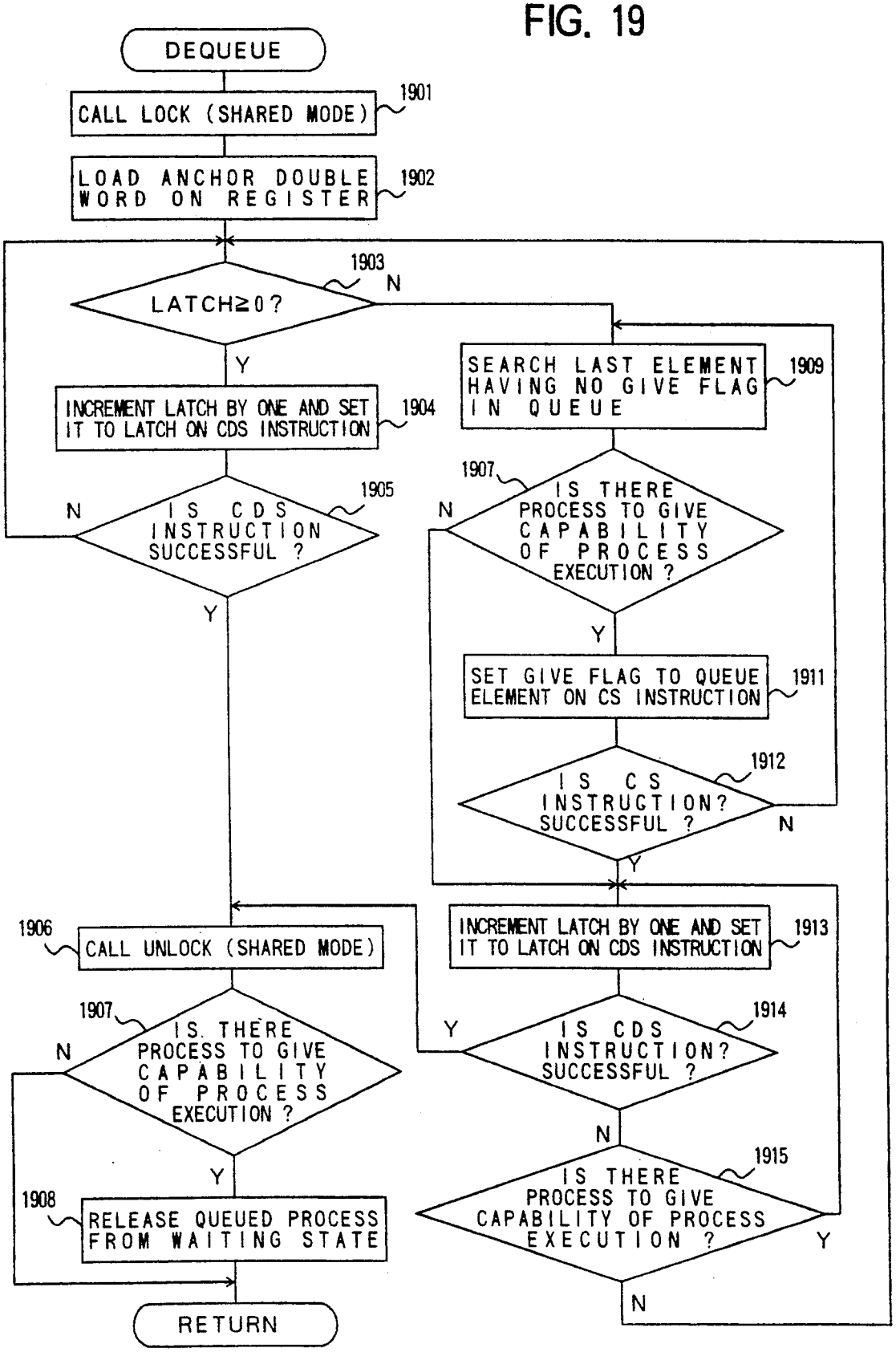

FIG. 19 shows the flow of the dequeue processing program. At first, the dequeue program obtains the shared mode lock at the step 1901 and loads the anchor double word to the adjacent two registers (step 1902). Next, it checks the loaded anchor double word for a value saved in the latch contained therein (step 1903). If the latch saves a value of zero or more, that is, there exists no process waiting for the capability of process execution, the program increments the latch by one (step 1904), releases the shared mode lock (step 1906), and returns to the caller. The use of this path results in always making the determination processing at the step 1907 false. If the CDS instruction is failed at the step 1905, it means that the other process rewrites the anchor double word, that is, the other process comes into conflict with the current process in the respect of the enqueue or dequeue processing or the anchor double word access at an interval between the loading of the anchor double word at the step 1902 and the execution of the CDS instruction at the step 1904. In this case, the dequeue program retries its processing from the step 1903.

If the latch saves a value of zero or less at the step 1903, it means that the process waiting for the capability of process execution exists in the queue. In this case, the dequeue program checks all the queue elements through the pointer chain from the anchor pointer and determines the last queue element having no transfer flag set thereto (step 1909). Since the queue element is inserted from the anchor pointer, it is understood that the queue element searched in such a manner matches to the oldest process waiting for the capability of process execution (in case of employing the FIFO queuing management).

If the dequeue program finds out a proper process to be given the capability of process execution (step 1910), it sets the transfer flag to the corresponding queue element based on the CS instruction. If the CS instruction is successful at a step 1912, the dequeue program increments the latch by one (step 1913). Then, if the CDS instruction is successful at a step 1914, at a step 1906, the dequeue program releases the shared mode lock for releasing the process obtaining the capability of process execution out of the queuing state (steps 1907, 1908).

In the shared mode unlock processing, if no other process obtaining the shared mode lock exists, the dequeue program obtains the exclusive mode lock for actually deleting the queue element having the transfer flag set thereto from the queue. That is, the transfer flag set to the queue element in the second embodiment is effective in controlling how the capability of process execution is given and as the deletion flag disclosed in the first embodiment.

If the dequeue program finds out no process to be given the capability of process execution at a step 1909, it may take place when the capability has already been given to the other processes at an interval from when the program determines there exists a process waiting for the capability of process execution at the step 1903 under the dequeue processing being concurrently executed by two or more processes to when it searches the process waiting for the capability at the step 1909. In this case, the dequeue program jumps to a step 1913 at which the latch is incremented. Likewise, if the CS instruction for setting the transfer flag is failed, it may take place when two or more processes come into conflict with each other in accessing the transfer flag for concurrently giving the capability of process execution to the same process waiting for it. In this case, this dequeue program goes back to the step 1909 for re-examining if another process waits for the capability.

If the CDS instruction is failed at a step 1914, it means that the process comes into conflict with the other process in the enqueue o dequeue processing and accessing the anchor double word. In this case, if the capability of process execution has been already given to the process waiting for it, that is, the transfer flag has been set to the queue element (step 1915), the dequeue program retries its processing from the step 1913 just for incrementing the latch by one. If the capability of process execution has not given to the process, the program retries the processing from the step 1903 because a new process may wait for the capability. This is effective in preventing an effective number of capabilities of process execution from being lowered because of the lag between the enqueue processing and the dequeue processing.

In the conventional lock mechanism, the management for the queue requires the exclusive mode lock for obtaining the enqueue and dequeue processings, while in the present embodiment, only the part of the shared mode unlock processing (step 1906) is subject to the exclusive mode lock. The invention therefore offers greatly-improved concurrent processings.

The foregoing embodiments are illustrative but the present invention is not limited to these embodiments.

As discussed in detail, the present invention is designed to provide a two-mode lock, that is, an exclusive mode and a shared mode locks in the serialization of access to the shared mode data list among the processes being concurrently processed, release the shared mode lock and simultaneously obtain the exclusive mode lock if no process obtains a lock as a result of releasing the shared mode lock. Hence, the invention can offer a conspicuous effect that it can realize an improved lock mechanism designed so that two or more processes have access to the shared mode data list as keeping a high concurrent processing level and flexibility on the processing. In particular, the invention is more effective in the tightly-coupled multiprocessor environment in which two or more instruction processors share the main storage. In addition, this invention makes it possible to easily shift the conventional lock mechanism to the improved lock mechanism having a higher concurrent processing level.

What is claimed is:

1. A data processing method for serializing an access to a shared data list being concurrently processed among processes in a data processing device having a lock/unlock feature with a shared mode lock and an exclusive mode lock for serializing access to a data list among concurrently operating processes, in a multiprocessing or multiprogramming environment, said method comprising the steps of:

providing a lock word containing an exclusive mode lock flag and a shared mode lock counter, said exclusive mode lock flag being set as a result of decrementing the shared mode lock counter to zero;

obtaining the shared mode lock for processes;

both, releasing the shared mode lock and simultaneously obtaining the exclusive mode lock, by a single task, if no other process of the processes obtains the lock/unlock feature as a result of releasing said process out of the shared mode lock, and logically deleting a data list element, and actually deleting the data list element when the shared mode lock is released and simultaneously the exclusive mode lock is obtained.

2. The data processing method according to claim 1, wherein the access to said data list is implemented by queue processing.

* * * * *